(12) United States Patent
Schlett

(10) Patent No.: US 6,563,228 B1
(45) Date of Patent: May 13, 2003

(54) POWER PLANT WITH A GAS TURBINE AND METHOD OF OPERATING IT

(75) Inventor: Hans-Werner Schlett, Waldshut (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/598,389

(22) Filed: Jun. 21, 2000

(30) Foreign Application Priority Data

Jun. 23, 1999 (DE) .......................... 199 28 711

(51) Int. Cl.⁷ .................... B60L 1/02; F01K 15/00; F01K 17/02; H02K 11/00; H02P 1/46
(52) U.S. Cl. .................. 290/2; 290/38; 322/58; 318/700
(58) Field of Search ............... 290/2; 318/700; 322/10; 379/399

(56) References Cited

U.S. PATENT DOCUMENTS

| | | | | |
|---|---|---|---|---|
| 3,764,815 A | * | 10/1973 | Habock et al. | 290/52 |
| 3,772,526 A | * | 11/1973 | Alwers | 290/38 |
| 4,029,555 A | * | 6/1977 | Heiser et al. | 235/151.21 |
| 4,031,404 A | * | 6/1977 | Martz et al. | 290/40 R |
| 4,069,424 A | * | 1/1978 | Burkett | 307/87 |
| 4,977,362 A | * | 12/1990 | Mader | 318/713 |
| 5,416,398 A | * | 5/1995 | Blatter | 318/700 |
| 5,559,421 A | * | 9/1996 | Miyakawa | 322/58 |
| 5,694,026 A | * | 12/1997 | Blanchet | 322/29 |
| 5,783,932 A | * | 7/1998 | Namba et al. | 322/16 |

FOREIGN PATENT DOCUMENTS

| | | |
|---|---|---|
| DE | 4204677 C1 | 6/1993 |
| DE | 19633579 A1 | 2/1997 |

OTHER PUBLICATIONS

E. Gatti et al., "Digital Control of Load Commutated Inverters for Starting Equipment of Gas Turbine Power Stations," *Proceedings of the European Conference on Power Electronics and Applications,* Sep. 13, 1993, pp. 250–255.

L. Denesdi, "Static starting of gas turbines," *ABB Review,* No. 3, 1992, pp. 33–38.

J. Pouliquen et al., "Le démarrage des grosses machines synchrones par convertisseur statique de fréquence," *RGE Revue Generale de l'Electricite,* No. 6, Jun. 1992, pp. 92–96.

* cited by examiner

Primary Examiner—Nestor Ramirez
Assistant Examiner—Julio Gonzalez Ramirez
(74) Attorney, Agent, or Firm—Burns, Doane, Swecker & Mathis, L.L.P.

(57) ABSTRACT

A power plant includes a gas turbine coupled to an electric generator. The electric generator can be connected to a high-voltage network through a generator switch and can be operated as a motor for the start-up of the gas turbine. The electric generator can also be connected to a static starting device for the run-up of the gas turbine. The static starting device is connected to a medium-voltage network which is provided for the auxiliary service of the power plant. The auxiliary voltage, provided in another way, of the medium-voltage network, produces a variable supply voltage for the generator operated as a motor. In such a plant, reduced circuit complexity is achieved by the fact that the static starting device is designed in such a way or can be activated in such a way that, after the run-up of the gas turbine, the static starting device itself produces the auxiliary voltage of the medium-voltage network from the voltage delivered by the generator.

9 Claims, 2 Drawing Sheets

POWER PLANT WITH A GAS TURBINE AND METHOD OF OPERATING IT

FIELD OF THE INVENTION

The present invention relates to the field of power plant technology.

BACKGROUND OF THE INVENTION

Such a power plant has been disclosed, for example, in U.S. Pat. No. 5,416,398 the entire disclosure of which is hereby incorporated by reference of the applicant.

The invention also concerns a method of operating such a power plant.

FIG. 1 shows a detail of the electrical circuit of a power plant 10 as disclosed by the prior art and as partly described in U.S. Pat. No. 5,416,398. The known power plant 10 includes at least one gas turbine 32, which is connected to an electric generator 15 via a shaft. During normal operation, the generator 15 driven by the gas turbine generates an AC voltage, which, via a then connected generator switch 14, a bus duct 31, a controllable-step-up transformer 13 equipped with a tap changer, and a line switch 12, is fed into a high-voltage network 11 (high voltage HV) for transmission to loads. Some of the power generated by the generator 15 is branched off from the bus duct 31 upstream of the step-up transformer 13 and is delivered via a connecting line 16, an auxiliary transformer 17 and a switch 18 to a medium-voltage network 21 (medium voltage MV), which carries an auxiliary voltage for meeting the demand for electric power for the auxiliary service of auxiliary components of the power plant 10 (for feed-water pumps, cooling-water pumps and the like.)

An auxiliary generator 19 (e.g. a diesel generator) can be connected to the medium-voltage network 21 via a further generator switch 20 in order to supply the medium-voltage network 21 for the auxiliary service with power in special cases. A low-voltage network 29 (low voltage LV), from which power can be drawn, for example, for the electronics of the power plant, is connected to the medium-voltage network 21 via a medium-voltage switch 26, a low-voltage transformer 27 and a low-voltage switch 28.

During start-up of the power plant 10, the gas turbine 32, which initially is at a standstill, has to be started or run up to firing speed. For this start-up or the run-up, the generator 15 is a drive motor for the coupled gas turbine 32. The variable or controllable supply voltage required for supplying the generator/motor 15 during run-up is provided by a static starting device 24. A switch 25 is provided between the static starting device 24 and the generator/motor 15. The static starting device, as described in U.S. Pat. No. 5,416,398, is preferably designed as a frequency converter and converts an AC voltage which is drawn from the medium-voltage network 21 via a switch 22 and a transformer 23. In this case, the auxiliary voltage on the medium-voltage network 21, during the start-up phase, may alternatively be drawn from the high-voltage network 11 via the connecting line 16 or be provided by the auxiliary generator 19.

During normal operation, the auxiliary voltage on the medium-voltage network 21 is drawn from the bus duct 31 via the circuit parts 16, 17 and 18. However, this has various disadvantages; for example, the generator voltage is controlled with reference to the reactive-power demand in the high-voltage network and the current voltage there. As a result, the voltage at the medium-voltage busbar or on the medium-voltage network 21 also varies, since it is connected directly to the generator via the circuit parts 18, 17 and 16. All the electrical loads in the power plant must be designed for the voltage fluctuations. In addition, with the normal voltage tolerances in the high-voltage networks, the transformer 13 is still to be equipped with a tap changer and a closed-loop control or open-loop control. Furthermore, an additional branch is necessary for the provision of the auxiliary voltage on the medium-voltage network 21, this additional branch including the connecting line 16, the auxiliary transformer 17 and the switch 18. In addition, a fire protection wall and an oil sump have to be provided in the region of the auxiliary transformer. At the same time, the branch necessitates a relatively long bus duct 31. Finally, since only coarse correction of the voltage fluctuations on the bus duct 31 is possible, all the electrical equipment in the power plant 10 which is supplied from the medium-voltage network 21 or the low-voltage network 29 has to be of more complicated design for a comparatively large voltage tolerances.

SUMMARY OF THE INVENTION

The object of the invention is therefore to conceive and operate a power plant of the type mentioned above in such a way that the above enumerated disadvantages are avoided and that substantial simplifications and savings are obtained, in particular in the design of the plant.

In the present invention, the static starting device, which in the starting phase of the gas turbine supplies the generator is operated as a motor, from the medium-voltage network, is at the same time used in the opposite direction during normal operation in order to, draw the requisite, in particular controlled, auxiliary voltage from the voltage, produced by the generator, for the medium-voltage network. By the use of the static starting device for the various purposes referred to, it is not only possible to dispense with entire circuit parts of the previous power plant, it is also possible, in a simple manner, to at the same time stabilize or correct the auxiliary voltage in such a way that the electrical equipment of the plant can be designed with smaller voltage tolerance and can therefore be of less complicated design.

A first preferred embodiment of the power plant according to the invention includes a static starting device which is designed as a converter which is constructed with power semiconductors and can be operated in both directions. This has the advantage that proven circuits, for example bridge circuits, with proven components, such as, for example, thyristors, may be used, which circuits can be constructed in a favorable manner and ensure reliable operation.

So that the requisite auxiliary voltage for the generator operated as motor is available without restriction in the starting phase, in another preferred embodiment of the invention, to produce the auxiliary voltage of the medium-voltage network during the run-up of the gas turbine, an auxiliary generator, preferably a diesel generator, can be connected to the medium-voltage network.

In a further preferred embodiment, in order to permit the use of electrical equipment with reduced voltage tolerance, means are provided for controlling the static starting device, and these means, during normal operation of the gas turbine, keep the auxiliary voltage produced by the static starting device on the medium-voltage network constant.

The method according to the invention for operating the power plant includes, to run the gas turbine up, the generator switch is kept open and the generator is used as a drive for the gas turbine, the supply voltage required by the generator being produced by, the static starting device from the auxiliary voltage of the medium-voltage network, and in that, after the run-up of the gas turbine, the generator switch is closed and the auxiliary voltage of the medium-voltage network is produced by the static starting device from the generator voltage delivered by the generator with small tolerances within all load ranges.

The auxiliary voltage required during the run-up of the gas turbine is preferably produced by an auxiliary generator connected to the medium-voltage network, and the auxiliary generator is shut down after the run-up has been completed.

BRIEF DESCRIPTION OF THE DRAWINGS

The invention is to be explained in more detail below with reference to exemplary embodiments in connection with the drawings, in which.

DETAILED DESCRIPTION OF THE INVENTION

Figure 1:
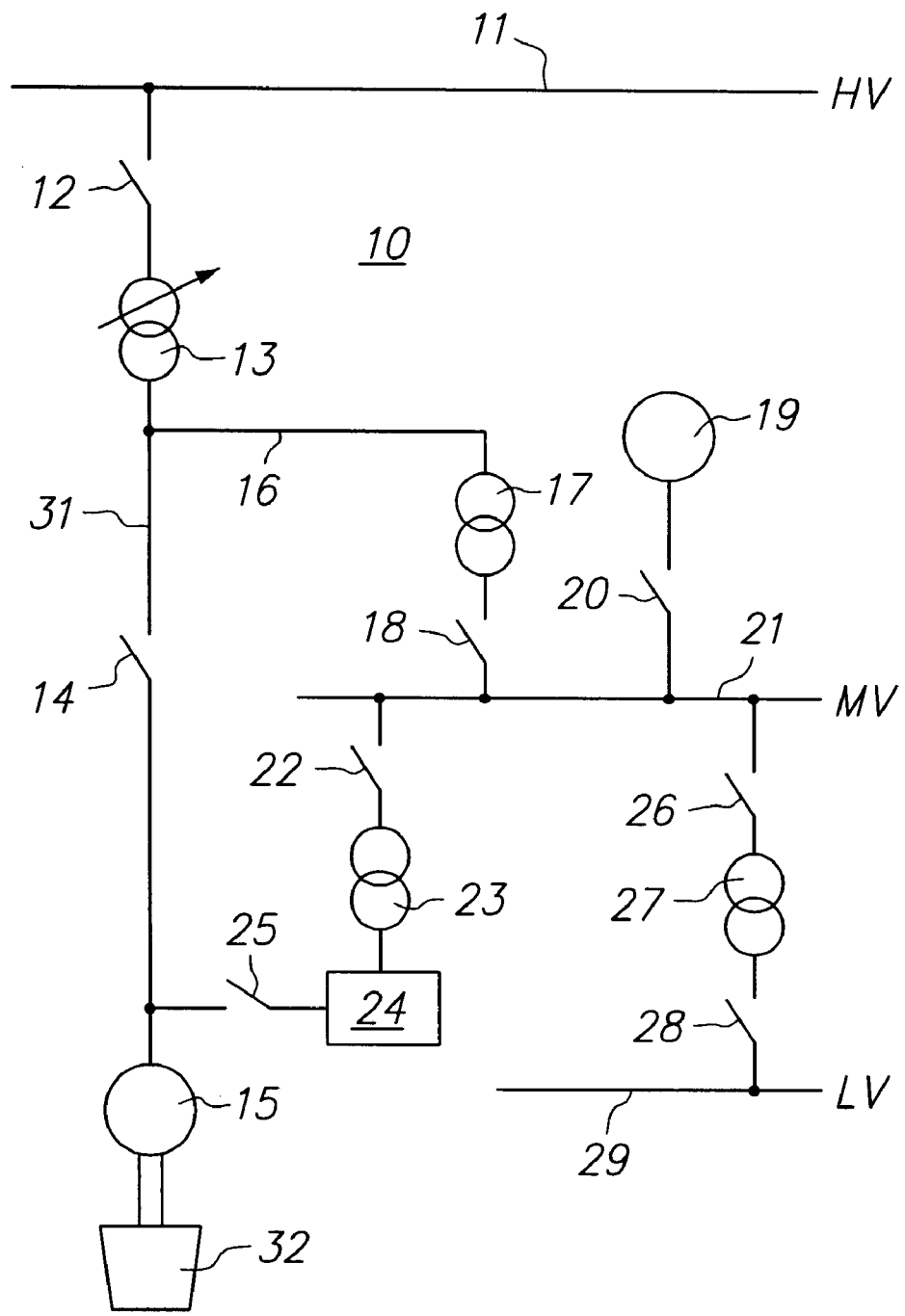
FIG. 1 shows a detail of an electrical circuit diagram of a power plant with a gas turbine and a static starting device according to the prior art.
Figure 2:
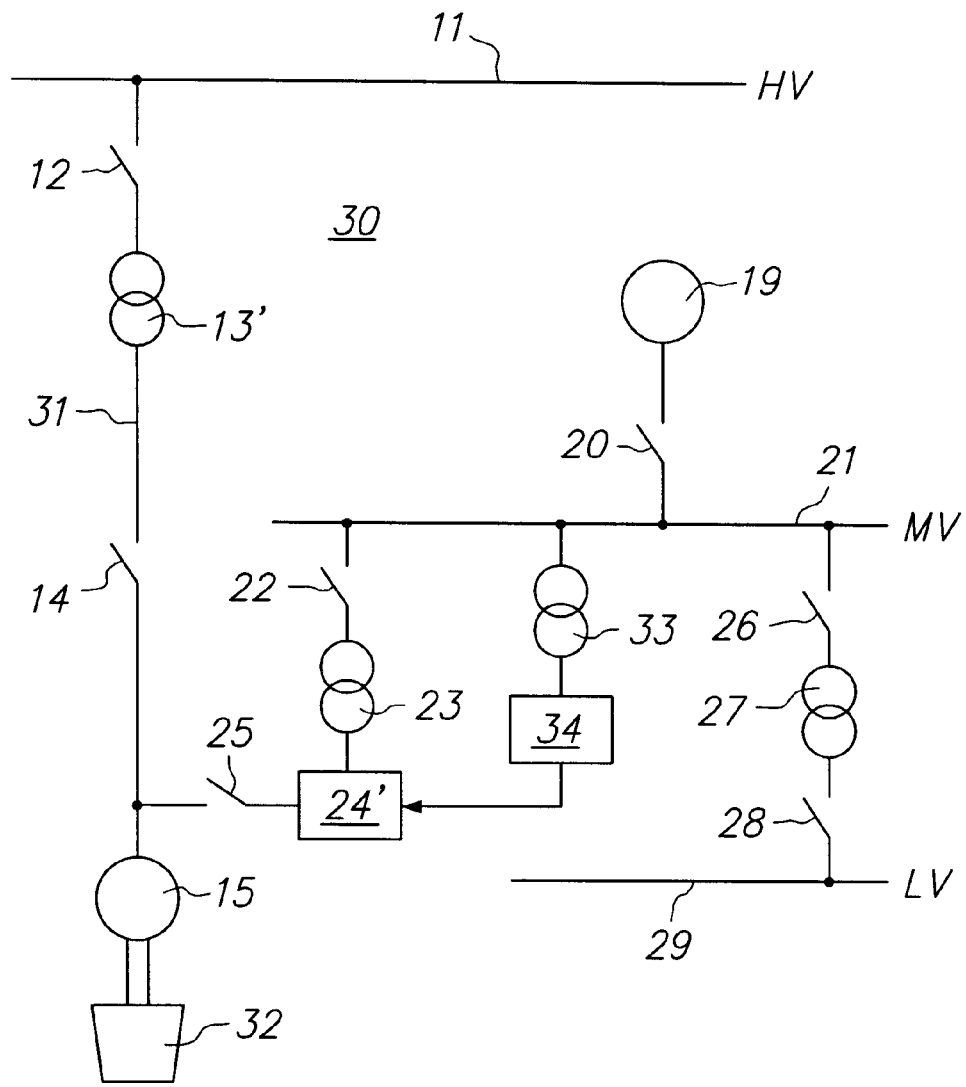
FIG. 2 shows a circuit diagram corresponding to FIG. 1 in a preferred exemplary embodiment of the invention.

The detail of the electrical circuit diagram which is analogous to FIG. 1 for a power plant 30 with gas turbine 15 is reproduced in FIG. 2. There are three essential changes compared with the circuit diagram from FIG. 1.

Firstly, there is no branch with the elements 16, 17 and 18 leading from the bus duct 31 to the medium-voltage network 21. This not only dispenses with these elements with of the additional devices, such as, fire protection walls and oil sumps as well as, the cable from the auxiliary transformer 17 to the switch 18, but also enables the bus duct 31 between the generator 15 and the step-up transformer 13' to be shortened.

Secondly, the static starting device 24 (working in one direction) from FIG. 1 is replaced by a static starting device 24' (working in both directions), which takes over the function of supplying the medium-voltage network 21 with auxiliary voltage.

Thirdly, the step-up transformer 13', unlike the step-up transformer 13 from FIG. 1, is designed without a tap changer. The correction of voltage fluctuations is performed directly by the static starting device 24', which for this purpose is provided with a control 34, which is connected to the medium-voltage network 21 for tapping the actual voltage via a voltage transformer 33.

The power plant 30 is operated in such a way that, to run the gas turbine 32 up, initially generator switch 14 is kept open and the generator 15 is used as a drive for the gas turbine 32, the supply voltage required by the generator 15 being produced by the static starting device 24' in its first operating mode from the auxiliary voltage of the medium-voltage network 21. After the gas turbine 32 has been run up, the generator switch 14 is closed and the auxiliary voltage of the medium-voltage network 21 is then produced by the static starting device 24' in its second operating mode from the generator voltage delivered by the generator 15. In the process, the auxiliary voltage produced by the static starting device 24' is kept constant by appropriate activation of the static starting device 24' via the control 34. The auxiliary voltage required during the run-up of the gas turbine 32 is preferably produced by an auxiliary generator 19 connected to the medium-voltage network 21. The auxiliary generator 19 is shut down after the run-up has been completed.

The following are some of the advantages realized with the invention:

the tap changer in the, step-up transformer is dispensed with;

the branch from the bus duct to the auxiliaries transformer is dispensed with;

the auxiliaries transformer is dispensed with;

the bus duct between the generator and the step-up transformer becomes shorter;

a fire protection wall and an oil sump at the auxiliaries transformer are dispensed with;

the cable from the auxiliary transformer to the switch at the medium-voltage network is dispensed with;

the electrical equipment in the power plant may be of Less complicated design for a smaller voltage tolerance; and due to the provision of the energy for the electrical auxiliary service via static starting device, the auxiliary voltage can be kept constant irrespective of the generator voltage.

Although this invention has been illustrated and described in accordance with certain preferred embodiments, it is recognized that the scope of this invention is to be determined by the following claims.

What is claimed is:

1. A power plant comprising:

a gas turbine;

an electric generator coupled to said gas turbine, said electric generator being connectable to a high-voltage network through a generator switch, said electric generator being operable as a motor for the start-up of the gas turbine;

a static starting device; and means for connecting the static starting device between a medium-voltage network and the generator so that the static starting device a) provides electricity from the medium voltage network to the generator when the generator is operating as a motor to run-up the gas turbine, and b) provides electricity from the generator to the medium voltage network after the run-up of the gas turbine.

2. The power plant as claimed in claim 1, wherein the static starting device is designed as a converter which is constructed with power semiconductors and is operable in both directions.

3. The power plant as claimed in claim 1, wherein, to produce the auxiliary voltage of the medium-voltage network during the run-up of the gas turbine, an auxiliary generator is connectable to the medium-voltage network.

4. The power plant as claimed in claim 1, wherein the static starting device is connected to the medium-voltage network through a transformer and a switch.

5. The power plant as claimed in claim 1, wherein means are provided for controlling the static starting device, said means keeping the auxiliary voltage produced by the static starting device on the medium-voltage network constant during operation of the gas turbine.

6. A method of operating a power plant, the power plant comprising a gas turbine coupled to an electric generator, said electric generator being connectable to a high-voltage network through a generator switch, said electric generator being operable as a motor for the start-up of the gas turbine and connectable to a static starting device for the run-up of the gas turbine, said static starting device being connected to a medium-voltage network and providing auxiliary voltage for service of auxiliary components of the power plant, said auxiliary voltage of the medium-voltage network also producing a variable supply voltage for the generator when said generator is operated as a motor, wherein in the static starting device, the auxiliary voltage of the medium-voltage network is produced from the voltage delivered by the generator, the method comprising:

keeping said generator switch open and using said generator as a drive for the gas turbine to run the gas turbine up;

producing the supply voltage required by the generator with the static starting device from the auxiliary voltage of the medium-voltage network;

after the run-up of the gas turbine, closing the generator switch and producing the auxiliary voltage of the medium-voltage network with the static starting device from the generator voltage delivered by the generator with small tolerances within all load ranges.

7. The method as claimed in claim 6, further comprising: producing the auxiliary voltage required during the run-up of the gas turbine with an auxiliary generator connected to the medium-voltage network and shutting down the auxiliary generator after the run-up has been completed.

8. The method as claimed in claim 6, further comprising: keeping the auxiliary voltage produced by the static starting device constant after the run-up of the gas turbine and during normal operation by controlling the activation of the static starting device.

9. The power plant as claimed in claim 3, wherein the auxiliary generator is a diesel generator.

* * * * *